United States Patent [19]

Matovich

[11] 4,208,373
[45] Jun. 17, 1980

[54] REACTOR-TUBE ASSEMBLY FOR FLUID-WALL REACTORS FOR HIGH TEMPERATURE CHEMICAL REACTION PROCESSES

[75] Inventor: Edwin Matovich, Brea, Calif.

[73] Assignee: Thagard Technology Company, Irvine, Calif.

[21] Appl. No.: 606,246

[22] Filed: Aug. 20, 1975

Related U.S. Application Data

[63] Continuation-in-part of Ser. No. 271,560, Jul. 13, 1972, Pat. No. 3,933,434.

[51] Int. Cl.² .............................................. B01J 1/00
[52] U.S. Cl. .................... 422/129; 29/612; 138/109; 138/123; 138/146; 219/549; 422/150; 422/199; 422/240; 422/241; 423/447.2
[58] Field of Search ................ 23/277 R, 284, 259.5; 138/109, 145, 146, 149, DIG. 2, 123; 285/238, 260; 422/199, 240–242, 129, 150; 423/447.2

[56] References Cited

U.S. PATENT DOCUMENTS

| | | | |
|---|---|---|---|
| 1,211,067 | 1/1917 | Braly | 138/123 X |
| 2,436,282 | 2/1948 | Bennet | 23/277 R |
| 2,516,973 | 8/1950 | Garrison | 48/214 R X |
| 2,595,408 | 5/1952 | Quest | 285/260 X |
| 2,653,887 | 9/1953 | Slayter | 138/DIG. 2 |
| 2,969,812 | 1/1961 | De Ganahl | 285/238 X |
| 3,090,678 | 5/1963 | Lewis et al. | 23/277 R X |
| 3,254,651 | 6/1966 | Collito | 285/260 X |
| 3,321,327 | 5/1967 | Blanchard et al. | 427/249 |
| 3,525,594 | 8/1970 | Barrett | 23/277 R X |
| 3,578,416 | 5/1971 | Pope | 23/277 R |
| 3,849,332 | 11/1974 | Bailey et al. | 23/277 R X |
| 3,933,434 | 1/1976 | Matovich | 23/277 R X |

Primary Examiner—Arnold Turk
Attorney, Agent, or Firm—Pennie & Edmonds

[57] ABSTRACT

A reactor-tube assembly for a high-temperature, fluid-wall reactor comprises a reactor tube made of a fabric of a fibrous, refractory material, two support rings positioned at the ends of the reactor tube, and means for securing the ends of the reactor tube to the support rings. Carbon or graphite cloth is a preferred fibrous refractory material out of which to make the reactor tube.

9 Claims, 24 Drawing Figures

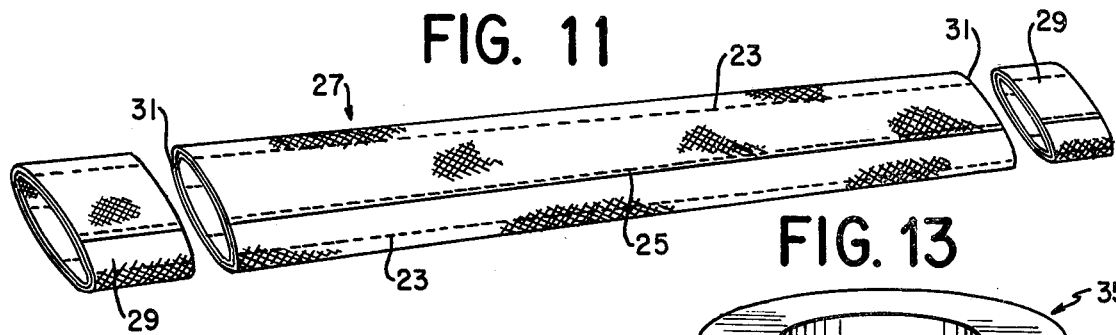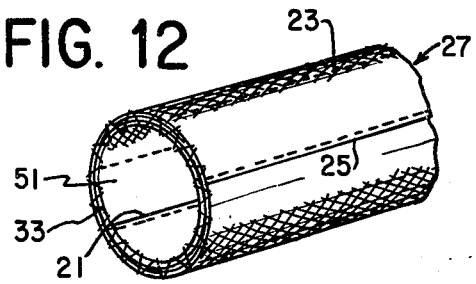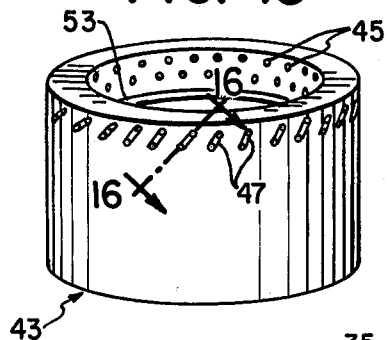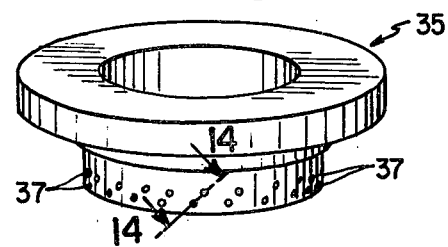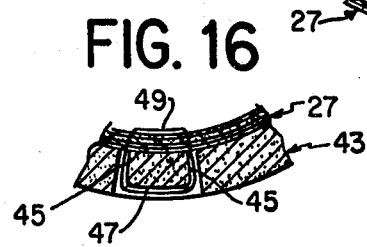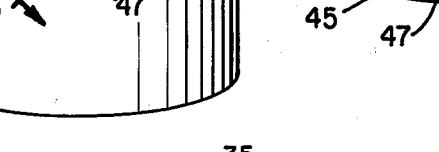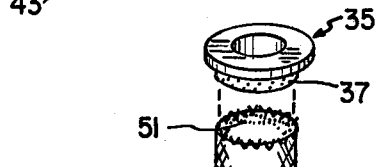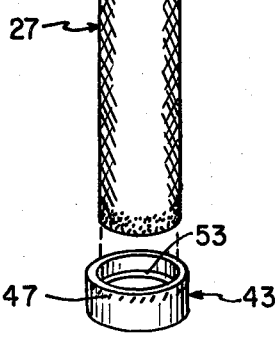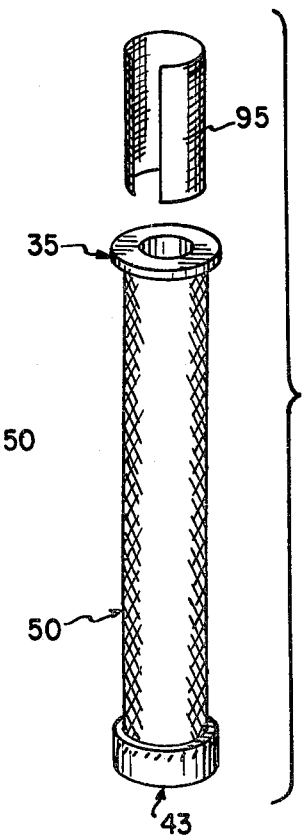

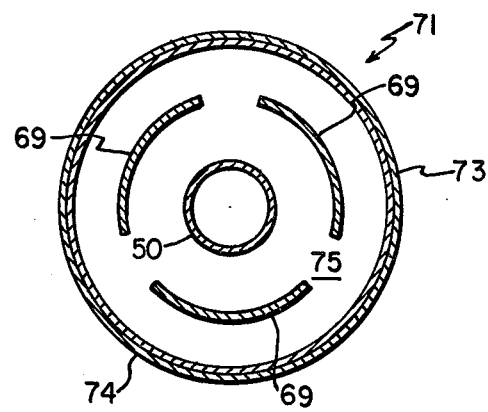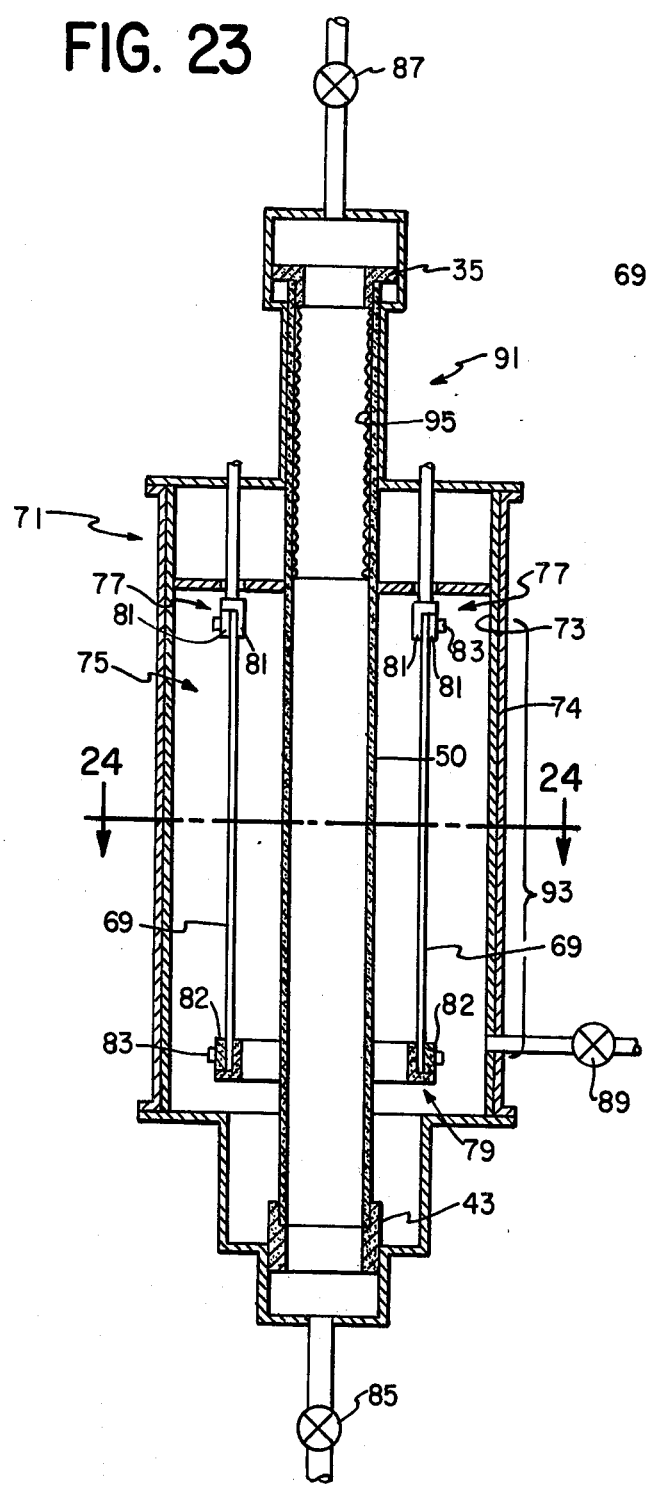

REACTOR-TUBE ASSEMBLY FOR FLUID-WALL REACTORS FOR HIGH TEMPERATURE CHEMICAL REACTION PROCESSES

CROSS-REFERENCE TO RELATED APPLICATION

This application is a continuation-in-part of copending application Ser. No. 271,560, filed July 13, 1972, now U.S. Pat. No. 3,933,434.

BACKGROUND OF THE INVENTION

The present invention relates generally to a reactor tube for use in a high temperature, fluid-wall reactor in which substantially all of the heat is supplied by radiation coupling, and which is useful for carrying out many chemical reactions which heretofore have been impractical or only theoretically possible.

In particular it is contemplated that the present reactor tube be utilized in a reactor which utilizes radiation coupling as a heat source, maintains the contemplated chemical reactions in isolation within a protective fluid blanket or envelope out of contact with the containing surfaces of the reactor tube, and which includes a heat shield which substantially encloses the radiant energy heating means and the reaction zone to define a black body cavity. As used herein, the term "black body cavity" is generally intended to denote a space which is substantially enclosed by a surface or surfaces which function as a heat shield and from which, ideally, no radiation can escape.

High temperature reactors are presently employed to carry out pyrolysis, thermolysis, disassociation, decomposition and combustion reactions of both organic and inorganic compounds. Substantially all such reactors transfer heat to the reactants by convection and/or conduction, but this characteristic inherently produces two major problems which limit the nature and scope of the reactions which may be carried out. Both problems result from the fact that in a conventional reactor, which transfers heat to the reactants by convection, the highest temperature in the system is necessarily at the interface between the inside wall of the reactor and the reactant stream.

The first problem involves the limitations on available temperatures of reaction which are imposed by the strength at elevated temperatures of known reactor wall materials. The decreasing capability of such materials to maintain their integrity under conditions of increasing temperature is, of course, well known. Since it is necessary that such materials be heated in order for thermal energy to be transferred to the reactant stream, available reaction temperatures have been limited by the temperature to which conventional reactor walls may be safely heated. This factor is particularly critical in cases where the contemplated reaction either must take place at or produces high pressures.

The second problem inherently results both because the wall of a conventional reactor is at the highest temperature in the system and because convective/conductive heat transfer requires contact between the wall and the reactant stream. Being at such elevated temperature, the reactor wall is an ideal if not the most desirable reaction site in the system and, in many instances, reaction products will accumulate and build up on the wall. Such build-up impairs the ability of the system to transfer heat to the reactants and this ever increasing thermal impedence requires the source temperature to be raised progressively just to maintain the initial rate of heat transfer into the reactant stream. Obviously, as the build-up increases, the required source temperature will eventually exceed the temperature capabilities of the reactor wall material. Moreover, as additional energy is required to sustain the reaction, the process becomes less efficient in both the technical and economic sense. Thus, at the point where the contemplated reaction can no longer be sustained on the basis of either heat transfer, strength of materials, or economic considerations, the system must be shut down and cleaned.

Usually, cleaning is performed mechanically by scraping the reactor wall or chemically by burning off the deposits. In some continuous processes, it has been attempted to scrape the reactor wall while the reaction proceeds. However, the scraping tool itself necessarily becomes a reaction site and, thereafter, must be cleaned. In any event, this down time represents a substantial economic loss. In many instances, a second system will be installed in order to minimize lost production time. However, such additional equipment generally represents a substantial capital investment. Some high temperature chemical reactors include a tube which is heated to a temperature at which its inner walls emit sufficient radiant energy to initiate and sustain the reaction. However, as in the case of conductive and convective reactors, for reactions yielding solid products there is frequently an undesirable build-up of product on the tube walls which leads to reduced heat transfer and even clogging of the tube.

The apparatus for the manufacture of carbon black disclosed in U.S. Pat. No. 2,062,358 includes a porous tube disposed within a heating chamber. Hot gas is directed from a remote furnace into the chamber, and thereafter forced through the wall of the porous tube to mix with the reactants. Thus, only convective transfer of heat from a fluid to reactants is employed. This, together with the absence of a "black body cavity" necessitates the flow of a large volume of fluid through the heating chamber in order to make up for heat losses.

U.S. Pat. No. 2,769,772 discloses a reactor for heat-treating fluid materials such as hydrocarbons which incluees two concentric tubes disposed in a flame heated furnace. Reactants flow axially through the pervious inner concentric tube. A heat-carrier gas flowing in the annular chamber between the concentric tubes is heated by contact with the outer wall. Fluids in the inner tube are heated by convection when the heat-carrier gas passes through the pervious wall and mixes with them. Radiant heat transfer is expressly avoided. In fact, it is impossible to heat the inner tube without simultaneously heating the outer tube to at least as high a temperature.

U.S. Pat. Nos. 2,670,272; 2,670,275; 2,750,260; 2,915,367; 2,957,753; and 3,499,730 disclose combustion chambers for producing pigment-grade titanium dioxide by burning titanium tetrachloride in oxygen. In the U.S. Pat. No. 2,670,275, which is representative of this group of references, titanium tetrachloride is burned in a porous, refractory tube. An inert gas is continuously diffused through the porous tube into a combustion chamber where it forms a protective blanket on the inner surface of the tube. This gaseous blanket substantially reduces the tendency of the titanium dioxide particles to adhere to the walls of the reactor. Since the combustion of titanium tetrachloride is an exothermic reaction, no provision is made to supply heat to the reaction mixture as it passes through tube. In fact, the U.S. Pat. No. 2,670,275, teaches that it is advantageous to remove heat from reactor chamber either by exposing the porous tube assembly to the atmosphere or by circulating a cooling fluid through a coil disposed about the porous tube.

The high temperature chemical reactor disclosed in application of Edwin Matovich, Ser. No. 271,560, filed July 13, 1972, now U.S. Pat. No. 3,933,434 entitled "High Temperature Chemical Reactor" overcomes the problems which has been encountered, but the porous, refractory reactor tube specifically described, being of monolithic construction, is subject to serious size limitations since the state-of-the-art is such that suitable porous refractory materials cannot be cast or machined economically in sizes large enough for large-scale operation. For example, at present, porous carbon tubes cannot be cast economically into tubes larger than about four feet in length and six inches in diameter. Porous ceramic tubes are also subject to such size limitations. Nor is it possible to circumvent these size limitations by constructing a large porous refractory tube from a series of rings stacked one on top of another because the nonuniformity of the flow of inert fluid at the joints between the rings will lead to carbon deposits near the joints.

SUMMARY OF THE INVENTION

The porous reactor tube of the present invention is suitable for use in a fluid-wall reactor, as are the invention heating elements. The reactor tube and heating elements are incorporated in the fluid-wall reactor disclosed in application of Edwin Matovich, Ser. No. 606,222, now abandoned, entitled "Fluid-Wall Reactor for High Temperature Chemical Reaction Processes." The reactor tube is made from a fibrous refractory material, such as carbon or graphite cloth. The heating elements are also made from such cloth and are generally cylindrical in shape. During operation of the reactor, the heating elements emit radiant energy which results in heating the reactor tube to a very high temperature.

Carbon cloth, the preferred refractory material for the present reactor tube, is relatively inexpensive, readily available, and may be formed into reactor tubes substantially larger than those of cast porous carbon presently available. Since carbon cloth is normally flexible, any attempt to force an inert gas radially inwardly through a reactor tube of such material in order to form the protective fluid wall or blanket would ordinarily cause the tube to collapse. Accordingly, the present invention contemplates the deposition of a layer of pyrolytic graphite on the cloth to stiffen it sufficiently to withstand the pressure differential maintained between the inert fluid plenum and the reaction zone within the tube. Depositing a layer of pyrolytic graphite on the cloth also permits control of the porosity of the fabric.

It may be advantageous in some applications to use steam or some other reactive gas as the blanket fluid. To retard the corrosion of the elements of the reactor which come in to contact with the reactive blanket gas, it is contemplated that a layer of a refractory oxide be deposited on the reactor tube, the heating elements and other exposed parts. If desired, any of the deposition or etching processes may be carried out without interfering with the operation of the reactor by introducing a suitable additive gas into the blanket gas.

In accordance with the present invention, a porous reactor tube may be fabricated by folding over a longitudinal edge of a sheet of carbon cloth upon itself, causing one surface of the carbon cloth to define a longitudinal space on the inside of the fold. The folded over edge is then secured in this position. A smooth-surfaced, contractible mandrel in its contracted state is placed adjacent the surface that defines the longitudinal space in a position which extends along the length of the edge. The mandrel is expanded to an outside transverse peripheral dimension only slightly smaller in magnitude than the inside transverse peripheral dimension of the folded-over portion of the sheet. Thus, a first portion of the sheet of carbon cloth is disposed around and in contact with the expanded contractible mandrel and the remaining portion of the sheet is attached to and extends from the first portion. A length of the extending portion of carbon cloth is then wound around the mandrel to form a multi-layer tube of carbon cloth. The layers of the tube are then bound to each other, for example by stitching with carbon thread. This tube may be used as a starting point for the fabrication of a reactor tube or a heating element. To form a reactor tube, the mandrel is contracted to bring at least a portion of the mandrel out of contact with the inside surface of the tube, thus allowing the mandrel to be withdrawn from the tube without snagging and pulling carbon fibers on the inside surface of the tube. Damage due to the snagging of fibers is likely to occur because of the relatively high coefficient of friction between the mandrel and the carbon tube. Accordingly prevention of such snagging by contracting the mandrel is especially important for, should a fiber become snagged, it will protrude from the inside of the reactor tube wall through the blanket gas and will thereby serve as a surface for the accumulation of materials.

Two transverse edges are defined on the tube by cutting the tube at two transverse positions. These edges are bound using any suitable binding technique, such as carbon cement or stitching with carbon thread. The relatively flexible fabric of which the tube material is made is stiffened by maintaining the tube at a relatively high temperature and exposing it to a carbonaceous gas which contacts the heated reactor tube causing the deposition of pyrolytic graphite. To from a heating element from the tube, stitches are made around the periphery of a portion of it to bind the layers of the carbon cloth and to delineate the shape of the heating element. Cuts are then made around the stitches to sever the heating element from the other portions of the tube. It is then desirable to bind the edges of the heating element and cut holes into the heating element which allow it to be conveniently coupled to a source of electrical power.

BRIEF DESCRIPTION OF THE DRAWINGS

FIGS. 1–12 illustrate successive steps in the formation of a porous reactor tube in accordance with the process of the present invention;

FIGS. 13–16 illustrate couplings for the reactor tube and show the connection of the couplings to the tube;

FIGS. 17 and 18 illustrate the final structure incorporating the porous reactor tube and the couplings;

FIG. 19 is a perspective view of the reactor tube and a screen used to support a portion which does not have pyrolytic graphite deposited in it;

FIG. 23 is a schematic representation of a plurality of heating elements and a reactor tube in a reactor; and FIG. 24 is a section taken substantially along line 24—24 of FIG. 23.

DETAILED DESCRIPTION OF THE PREFERRED EMBODIMENT

To form a porous reactor tube in accordance with the preferred method of the present invention, it is desirable to fabricate an inflatable mandrel having an outer diameter which is a function of the inner diameter of the desired porous reactor tube. A process for forming such a mandrel is illustrated in FIGS. 1–4.

The inflatable mandrel is formed by first winding several layers of a sheet 1 of stiff support material on a rigid mandrel 3. Sheet 1 may, for example, be a heavy manila paper, such as kraft paper, which is stiff enough to serve as a support surface when wound into a tube 5. It may also be desirable to bind the inner and outer longitudinal edges of the sheet material to prevent the tube from unraveling. A sheet 7 of a smoth-surfaced material is then sprially wound over tube 5. Such winding is preferably done in a direction opposite to that in which sheet 1 was wound. Sheet 7 may be any material having a smooth surface, such as Mylar, a glassine paper, or a sized paper having a smooth surface. The purpose of sheet 7 is to provide the expandable mandrel with a very smooth surface.

Figure 1:
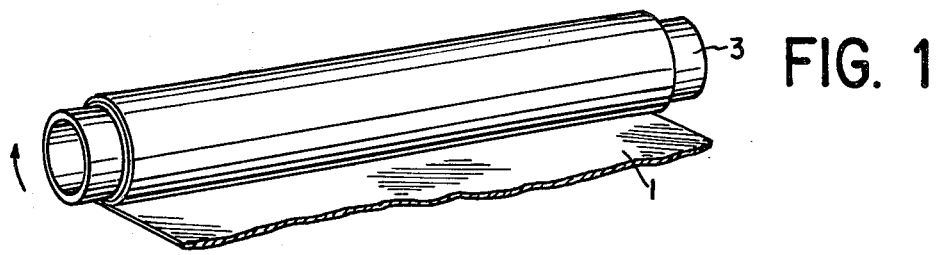
Figure 2:
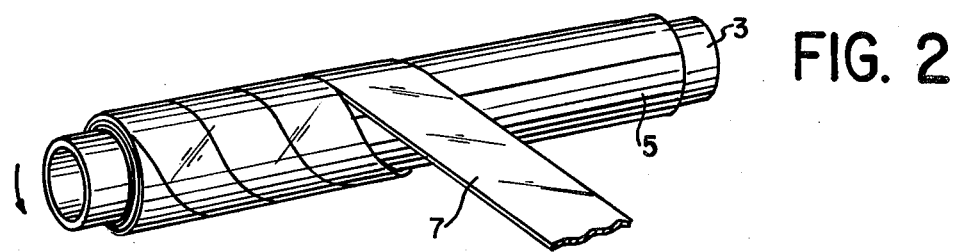
Figure 3:
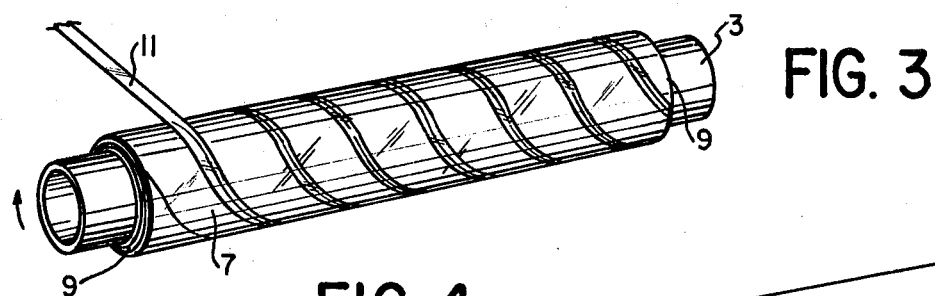
Figure 4:
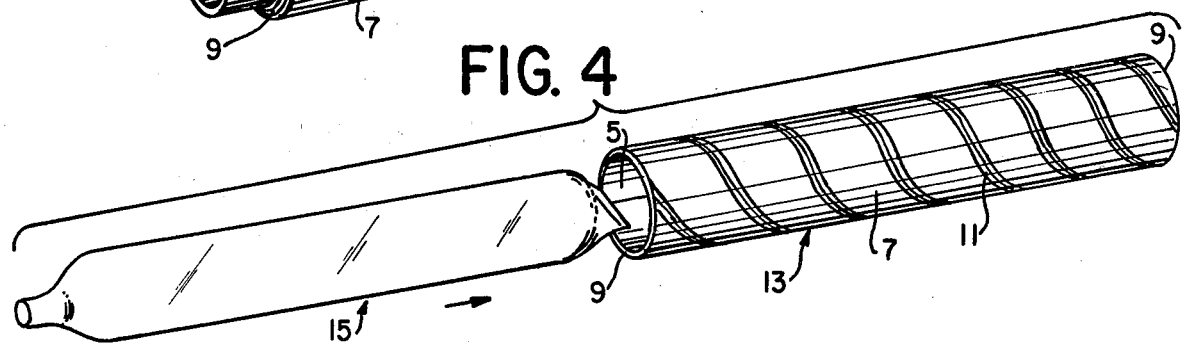
Figure 5:
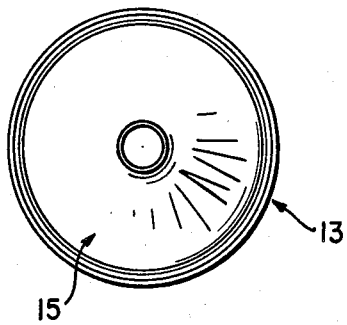
Figure 6:
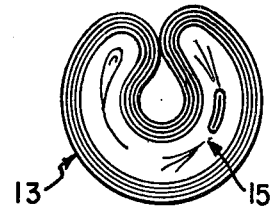

After sheet 7 has been wound over tube 5 and trimmed to conform to the longitudinal edges 9 of tube 5, a smoth-surfaced tape 11 is used to secure sheet 7 to the tube, thereby forming a contractible mandrel 13. Tape 11 may be any suitable smooth surfaced tape, such as ordinary cellophane tape. After tape 11 has been applied, the finished contractible mandrel 13 may simply be slipped off rigid mandrel 3. An expandable balloon tube 15 is then inserted into mandrel 13. When balloon tube 15 is inflated, it completely fills mandrel 13, as is illustrated in FIG. 5. The finished mandrel 13 with balloon 15 in it is then used as the mandrel upon which the porous reactor tube is wound.

It is not practical to fabricate a porous reactor tube by winding a carbon cloth on a mandrel which cannot be contracted, because carbon cloth has a relatively high coefficient of friction which causes it to cling to the mandrel. Although it is possible to remove a small tube from a mandrel, this operation is quite time consuming and not very practical. Naturally, these problems become increasingly significant with increasingly larger tubes.

Yet another problem in the removal of a tube made of carbon cloth from a non-inflatable mandrel is the tendency of carbon fibers on the inside surface of the sidewalls of the reactor tube to be pulled by the mandrel which can result in a surface having protruding carbon fibers. Such pulled fibers are undesirable because they extend beyond the fluid wall which protects the inside surface of the tube, and tend to serve as points for the assumulation of depositions of carbon or other reaction products. It is therefore desirable to use a contractible mandrel such as that illustrated in FIG. 5.

Figure 7:
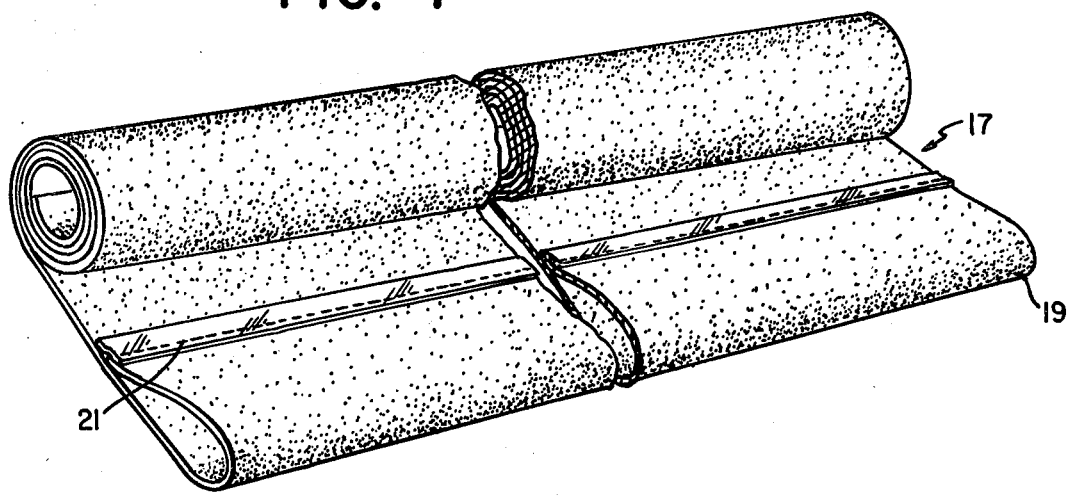
Figure 8:
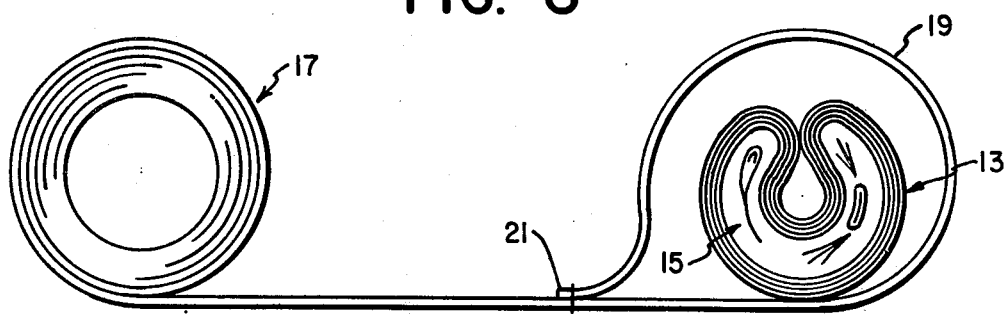

The formation of the reactor tube is initiated by taking a sheet 7 of a flexible fibrous refractory material such as carbon or graphite cloth and folding it over upon itself to form a loop 19. The longitudinal edge of the carbon cloth is then secured as illustrated in FIG. 7. Stitches 21, which may be made of carbon thread or any other suitable refractory material, may be used for this purpose. The compressed mandrel 13 with the deflated balloon 15 is then inserted into the longitudinal loop 19 as is illustrated in FIG. 8. Balloon 15 is then expanded causing mandrel 13 to assume a substantially round cross-sectional shape. The loop 19 which is sewn into sheet 17 is preferably slightly larger than the outside diameter of mandrel 13.

Figure 9:
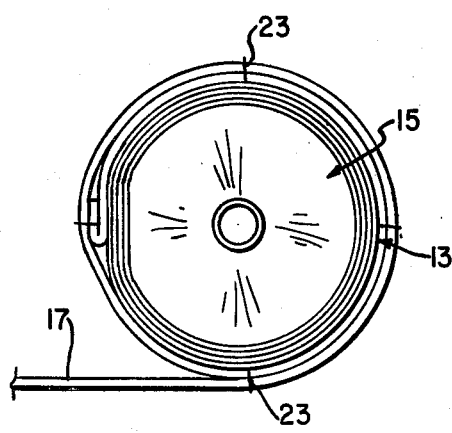

The mandrel 13, expanded by the inflation of balloon 15, is illustrated in FIG. 9. The sheet 17 is then wound around the mandrel with, periodic stops to bind the newly wound carbon cloth to the subjacent layer. This may be done using any suitable binding technique, such as stitching with carbon thread. Such binding usually takes the form of stitches 23 which extend longitudinally along the length of the reactor tube. Binding stitches 23 are spaced along the circumference of the tube, typically about 40 to 50 degrees apart. When about 4 or 5 layers of carbon cloth have been wound on the mandrel, giving the tube a thickness in the range between $\frac{1}{8}$ and $\frac{1}{4}$ of an inch, the carbon cloth is cut longitudinally (if it has not been precut to be the proper size) and bound with a closing stitch 25. Stitches 23 and 25 may extend through two or more layers of carbon cloth. An additional advantage is here obtained through the use of the contractible mandrel. Specifically, since the mandrel is also resilient, the needle used to form stitches 21, 23 and 25 may most easily enter and leave the tube of carbon cloth, insofar as the mandrel may be deformed to allow the needle a direct path without deforming the carbon cloth. A crescent shaped needle has been found suitable for the stitching operation.

Figure 10:
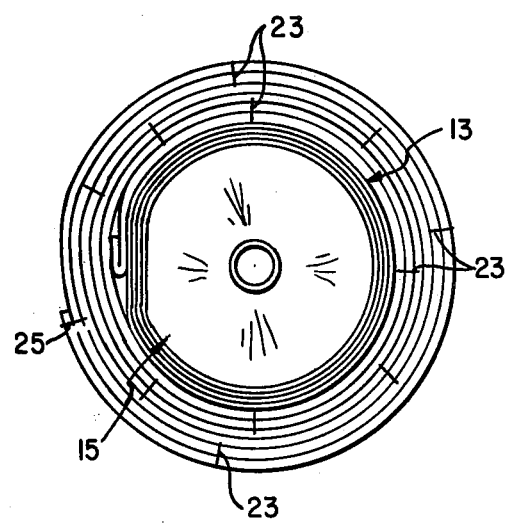

After the winding and stitching of the carbon cloth, as above detailed, has been completed, the contractible mandrel with sheet 17 wound on it (FIG. 10) is contracted by the application of mechanical force. Such application may simply take the form of manually crushing the cloth and mandrel. Alternatively, the balloon may be glued to the inside wall of the mandrel and the combination contracted by the application of a vacuum to the balloon.

After the mandrel has been contracted, it is withdrawn. As illustrated in FIG. 11, this leaves a tube 27 which is then trimmed to the desired length by the removal of end portions 29. The longitudinal edges 31 are then bound with a binding stitch 33 as illustrated in FIG. 12.

One of the edges 31 of the tube 27 is provided with an inlet support ring 35 which includes a plurality of passages 37 and depressions 39 for facilitating binding to one of the edges 31 of tube 27. Binding stitches 41 pass through passage 37 around depression 39 through another passage 37 at the other end of depression 39 and around the carbon cloth surface of tube 27, thereby securing tube 27 to support ring 35. The other end of tube 27 is bound to an outlet support ring 43 (FIG. 15), which includes passages 45 and depressions 47 for facilitating the placement of a binding stitch 49 into the tube 27. The tube thus takes the form illustrated in exploded perspective in FIG. 17 and in perspective in FIG. 18. The carbon cloth may be sealed to the supports 35 and 43 using a carbon cement. Such cements are well known and may have any one of a number of different formulations. Typically, such a formulation would be a phenolic binder in a diluent within which finely divided graphite or carbon is contained. Application of the carbon cement results in providing the finished reactor tube 50 with two well-sealed couplings for connection into a reactor. The manner of coupling the inlet support ring 35 to the tube 27 is not critical. However, it is desirable that the interface between outlet support ring 43 and tube 37 not present a surface capable of collecting deposits of reaction products. Tube 27 is therefore contained within support ring 43 and its inner surface 51 is flush with an inner surface 53 of support ring 43.

Figure 20:
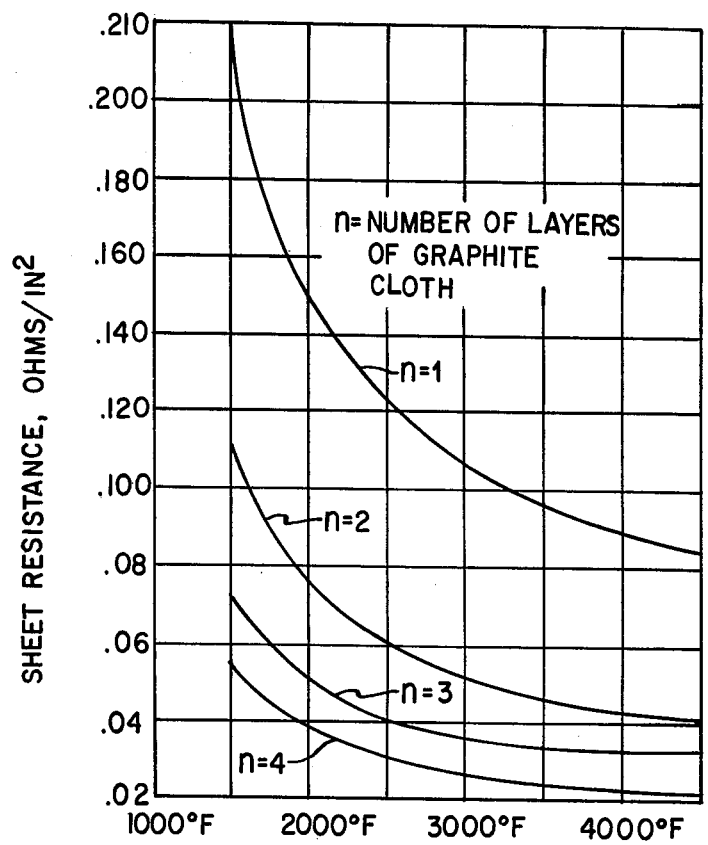
FIG. 20 is a graphical representation of the electrical resistance of a reactor heating element of the present invention as a function of temperature and the number of layers of refractory fabric which constitute such element.
Figure 21:
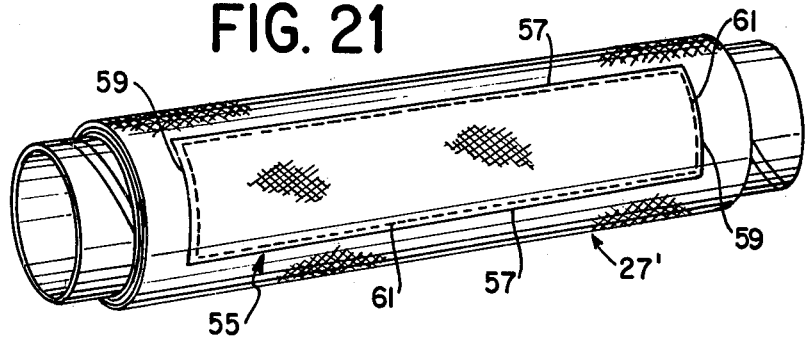
FIGS. 21 and 22 illustrate successive steps in the fabrication of a heating element.

Heating elements may also be fabricated using a contractible mandrel technique similar to that described above. Although the mandrel need not be contractible, its resilience does facilitate stitching. The process steps described in connection with FIGS. 1–10 are followed, with the exception that a suitable mandrel 13 having a diameter significantly larger than that of the mandrel used to make the reactor tube is used. The number of layers that are wound depends upon the impedence desired at a given temperature. A typical display of impedence charateristics as a function of the number of layers of carbon cloth and temperature is shown in FIG. 20.

After a large tube 27' has been wound, a portion of the tube which subtends 90 degrees of the tube is delineated by being marked off. Such marking 55 may be done using any suitable technique such as chalk or white thread. The marked-off portion is defined by two straight longitudinal edges 57 and two arcuate transverse edges 59. Arcuate transverse edges 59 are defined by planes normal to the axis of tube 27' and separated by a distance equal to the desired length of the heating element.

Figure 22:
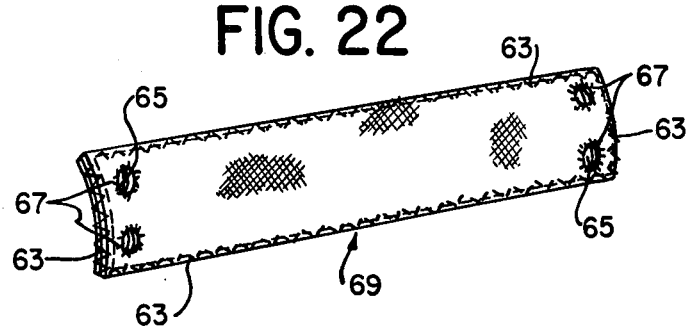

Stitches 61 may be made with carbon thread or any other suitable material. Thereafter a sharp blade or other cutting tool is used to carefully cuts around stitches 61, thereby removing an arcuate heating element from tube 27'. The heating element is then sewn with a binding stitch 63, as is illustrated in FIG. 22. After four openings 65 have been cut into the heating element and secured with binding stitches 67, the finished heating element 69 is ready to be installed in a reactor. The same process is repeated to form additional heating elements 69, each heating element being cut from a 90 degree portion of tube 27'. Since only those portions of tube 27' which do not contain the original binding stitches 21 are used, the resultant heating elements do not have an irregularity due to binding stitches 21.

The reactor tube 50 and heating elements 69 are utilized in the high temperature reactor disclosed in the above-referenced patent application Ser. No. 606,222 now abandoned, entitled "Fluid-Wall Reactor For High Temperature Chemical Reaction Processes". Such a reactor 71 is schematically illustrated in FIGS. 23 and 24. The reactor 71 comprises a heat shield 73 and a pressure vessel 74 which, together with reactor tube 50, defines an annular space or plenum 75. Support rings 35 and 43 are held within the reactor by suitable mounting structure. Heating elements 69 are supported and provided with electrical power by three arcuate heating element supports 77 and a 3-phase center connection ring 79. The heating element supports 79 are electrically coupled to first ends of heating elements 69 through the use of an electrical contact structure which includes pairs of arcuate compression plates 81 one of which is integral with supports 77 which are placed on opposite sides of heating elements 69 and are urged toward each other and against heating elements 69 by bolts 83 which extend through compression plates 81 and holes 65 in the heating elements. This structure positively secures heating elements 69 both electrically and mechanically within reactor 71. The second ends of heating elements 69 are similarly attached to center connection ring 79 by means of arcuate compression plates 82.

Insofar as the carbon cloth of which reactor tube 50 is made is very pliable, the pressure differential between the inert fluid plenum 75 and the interior of the reactor tube 50 will ordinarily cause tube 50 to collapse inwardly if it is not stiffened. Accordingly, a refractory coating such as pyrolytic carbon may be deposited on a portion of the fibrous refractory material of which reactor tube 50 is made in order to increase its rigidity. Ordinarily, this is done before the reactor is first operated. To deposit a coating of pyrolytic graphite, a voltage is applied across heating elements 69, causing them to heat the reactor tube 50 to a temperature of about 1900° C. The output of reactor tube 50 is first sealed by closing a valve 85. A gas is applied under pressure through valve 87 and caused to flow into the interior of reactor tube 50 and from there radially outwardly through the porous wall of reactor tube 50 into plenum 75. The application of a gas, such as molecular nitrogen under pressure, into tube 50 has the result of expanding tube 50 to its maximum diameter. This gas is then allowed to leave plenum 75 through a suitable outlet means, such as valve 89. A carbonaceous gas is also introduced through valve 87, having been mixed with the first gas and supplied under pressure together with the first gas.

The carbonaceous gas dissociates on the hot surfaces with which it comes in contact, providing that these surfaces are heated to above the dissociation temperature of the carbonaceous gas. Dissociation of the carbonaceous gas results in depositing pyrolytic graphite on these hot surfaces. Insofar as all of the carbonaceous gas is not dissociated on passing through the walls of reactor tube 50, pyrolytic graphite will also be formed on heating elements 69 and on heated surfaces of heat shield 73. Besides increasing the rigidity of the tube 50, the deposition of graphite has the additional effect of changing the porosity of the tube. Typically, the pore diameter is in the range between 0.001 and 0.020 inches.

Inasmuch as a portion 91 of the reactor tube is not within the black body cavity, it is desirable to provide that portion of the reactor tube with an inner stainless steel screen 95 which prevents collapse of that portion of the reactor tube under the pressure differential of the blanket gas.

It may be advantageous in some applications to use steam or another reactive gas as the blanket fluid. To retard the corrosion of materials within the reactor it may therefore be advantageous to deposit a refractory oxide on the portions of the reactor tube 50, heating elements 69, and the inside surface of heat shield 73 which contact the wall fluid and operate at high temperatures. Suitable refractory oxides are thorium oxide, magnesium oxide, zinc oxide, aluminum oxide, or zirconium oxide. To deposit a layer of refractory oxide, a refractory deposition agent which is a volatile metal-containing compound such as methyl-magnesium chloride, magnesium ethoxide, or zirconium-n-amyloxide may be employed. Methyl-magnesium chloride decomposes on a surface heated to about 600° C. to deposit a layer of magnesium metal. The magnesium metal may subsequently be oxidized, if necessary, by introducing steam or molecular oxygen into plenum 75. Zirconium-n-amyloxide and magnesium ethoxide both generally decompose on heated surfaces to form zirconium oxide and magnesium oxide, respectively.

Referring again to FIG. 23, the volatile metal-containing compound may be introduced into a carrier gas to be sent to plenum 75 by bubbling the gas through a solution of the volatile metal-containing compound. For example, methylmagnesium chloride may be dissolved in diethyl ether and zirconium-n-amyloxide in tetrahydrofuran. An atmosphere containing metal-containing compound as well as, in most cases, some solvent vapor, is produced by the bubbling of the carrier gas through the liquid. This atmosphere is passed through valve 89 into plenum 75. The volatile metal-containing compound decomposes on the hot surfaces with which it comes into contact. If the metal-containing compound decomposes into a pure metal, oxygen or steam may be introduced into plenum 75 in order to oxidize it.

We claim:

1. A reactor-tube assembly for a high-temperature reactor in which substantially all of the heat is supplied by radiation coupling, including:
   (a) a reactor tube having a first end with a first end opening passing therethrough defining an inlet to the reactor tube, having a second end with a second end opening passing therethrough defining an outlet to the reactor tube, and having an interior defining a passageway which extends between the first and the second end openings, the reactor tube being made of a porous fabric of a fibrous, refractory material;
   (b) a first support ring having an opening passing therethrough, the first support ring being positioned adjacent the first end of the reactor tube with the opening of the support ring generally coaxial with the first end opening of the reactor tube so that the opening of the first support ring communicates with the interior of the tube through the first end opening;
   (c) means for securing the first end of the reactor tube to the first support ring;
   (d) a second support ring having an opening passing therethrough, the second support ring being positioned adjacent the second end of the reactor tube with the opening of the support ring generally coaxial with the second end opening of the reactor tube so that the opening of the second support ring communicates with the interior of the tube through the second end opening; and
   (e) means for securing the second end of the reactor tube to the second support ring.

2. The reactor-tube assembly according to claim 1 in which the material of which the reactor tube is made consists essentially of a carbon cloth.

3. The reactor-tube assembly according to claim 1 in which the material of which the reactor tube is made consists essentially of a graphite cloth.

4. The reactor-tube assembly according to claim 1 in which:
   (b.1) the first support ring has a plurality of passages spaced apart about the opening in the ring;
   (c.1) the means for securing the first end of the reactor tube to the first support ring includes a carbon thread which passes through the fabric of the tube and the passages in the first support ring to stitch the tube to the ring;
   (d.1) the second support ring has a plurality of passages spaced apart about the opening in the ring; and
   (e.1) the means for securing the second end of the reactor tube to the second support ring includes a carbon thread which passes through the fabric of the tube and the passages in the second ring to stitch the tube to the ring.

5. The reactor-tube assembly according to claim 1 in which the means for securing the first and second ends of the reactor tube to the first and second support rings includes a carbon cement.

6. The reactor-tube assembly according to claim 1 in which the porous fabric of a fibrous, refractory material of which the reactor tube is made consists essentially of a flexible fabric of a fibrous first refractory material coated with a layer of a second refractory material to stiffen the tube.

7. The reactor-tube assembly according to claim 6 in which the first refractory material is a carbon cloth and the second refractory material is pyrolytic graphite deposited on the carbon cloth.

8. The reactor-tube assembly according to claim 1 in which the material of which the reactor tube is made consists essentially of a fabric of a fibrous first material capable of withstanding high temperatures coated with a layer of a refractory oxide.

9. The reactor-tube assembly according to claim 7 in which the refractory oxide is thorium oxide, magnesium oxide, zinc oxide, aluminum oxide, or zirconium oxide, or mixtures thereof.

* * * * *

UNITED STATES PATENT AND TRADEMARK OFFICE
CERTIFICATE OF CORRECTION

PATENT NO. : 4,208,373
DATED : June 17, 1980
INVENTOR(S) : Edwin Matovich

It is certified that error appears in the above-identified patent and that said Letters Patent are hereby corrected as shown below:

Column 2, line 44, "incluees" should read -- includes --.

Column 3, line 11, "has" should read -- had --.

Column 4, line 45, "from" should read -- form --.

Column 5, line 26, "smoth" should read -- smooth --.

Column 5, line 27, "sprially" should read -- spirally --.

Column 5, line 64, "assumulation" should read -- accumulation --.

Column 5, line 68, "sheet 7" should read -- sheet 17 --.

Claim 9, line 1, "according to claim 7" should read -- according to claim 8 --.

Signed and Sealed this

Twenty-fifth Day of November 1980

[SEAL]

Attest:

SIDNEY A. DIAMOND

Attesting Officer     Commissioner of Patents and Trademarks